US005271136A

United States Patent [19]

Skoworodko

[11] Patent Number: 5,271,136

[45] Date of Patent: Dec. 21, 1993

[54] PRESS

[76] Inventor: Mike Skoworodko, 540 - 33255 South Fraser Way, Abbotsford, British Columbia, Canada, V2S 2B2

[21] Appl. No.: 982,710

[22] Filed: Nov. 27, 1992

[51] Int. Cl.[5] ............................................ B23P 19/04

[52] U.S. Cl. ............................................ 29/257

[58] Field of Search ................. 29/257, 263, 264, 282, 29/251

[56] References Cited

U.S. PATENT DOCUMENTS 2,834,099 5/1958 Gasper ................................ 29/257

4,235,004 11/1980 Floyd ................................ 29/257

*Primary Examiner*—Robert C. Watson

*Attorney, Agent, or Firm*—Daniel L. Dawes

[57] ABSTRACT

A press to remove a pin contained in a body. The press has a housing with a recess to fit over the body with a first part of the housing on one side of the body and a second part on the other side of the body. There is a channel in the first part of the housing, and a channel in the second part of the housing. These channels are substantially coaxial. The channel in the first part of the housing has a threaded portion. It receives a threaded member that is able to extend into the channel. A sleeve is received in the channel. A spring tends to urge the sleeve from the channel. The arrangement is such that the sleeve may be positioned over one end of the pin and the threaded member rotated to drive the pin along the channels and out of the body.

6 Claims, 1 Drawing Sheet

PRESS

DESCRIPTION OF THE PRIOR ART

This invention relates to a press, in particular a press to move a pin contained in a body. The invention finds particular application in the removal of a clevis pin from a clevis or yoke as it is also called.

DESCRIPTION OF THE PRIOR ART

Clevis pins are frequently used to secure two components together. One component is formed with a clevis or yoke and the other with a rod end. The clevis and rod end are formed with openings that can be aligned and the clevis pin inserted. The clevis pin has a head at one end and an opening through the other end. The pin is located by placing a split pin through the opening to secure the clevis pin in the clevis. This arrangement is widely used. The use of main interest for the present invention is in brake slack adjusters in trucks, buses and other heavy vehicles.

Brake slack adjusters are used to control the adjustment of the air brakes. The brake slack adjuster comprises a housing, mounted on a shaft, with an arm extending from the housing. The brake slack adjuster is a means of taking up the slack caused by wear of the brakes and in the system. If no compensation is carried out for wear then the brakes become unsafe due to excessive travel. The additional movement necessary in the system can mean that components within the system do not align properly, which has an adverse effect on the operation of the brakes.

Like any component on a truck or heavy duty vehicle the brake slack adjusters must be serviced. They are subjected to heavy wear in adverse conditions. Corrosion is inevitable. This corrosion, in addition to reducing the efficiency of the system, also introduces problems in serving the system. These problems are compounded by the fact that the connections are frequently in inaccessible positions, making it difficult to get proper access to the components to allow their dismantling.

SUMMARY OF THE INVENTION

The present invention addresses the problem. The invention is a press to remove a pin contained in a body, the press comprising a housing having a recess to fit over the body with a first part of the housing on one side of the body and a second part on the other side of the body; a first channel in the first part of the housing and a second channel in the second part of the housing, the channels being substantially coaxial; a threaded portion in the first channel; a threaded member received in said threaded portion and able to extend into the first channel; a sleeve slidably received in the first channel; resilient means tending to urge the sleeve from the first channel, whereby the sleeve may be positioned over one end of the pin and the threaded member rotated to drive the pin along the channel and out of the body.

Preferably the second channel is dimensioned to be a close fit over the head of a pin having a shaft with a head on it, for example a clevis pin. The sleeve is preferably dimensioned to be a close fit over the shaft of the pin. The resilient means will normally be a coil spring, housed in the first channel, between the threaded portion and the sleeve.

DESCRIPTION OF THE DRAWINGS

The invention is illustrated in the drawings in which.

DESCRIPTION OF THE PREFERRED EMBODIMENTS

Figure 1:
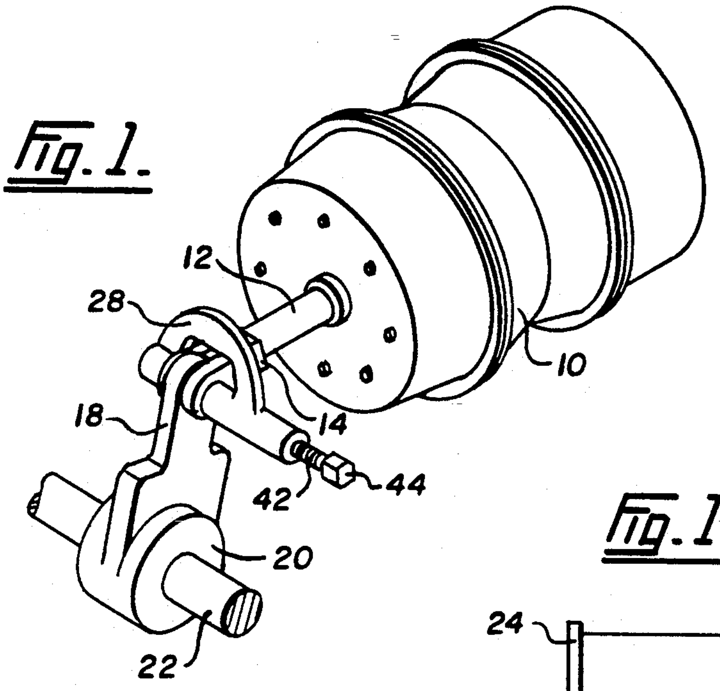
FIG. 1 an isometric view illustrating use of the press according to the present invention.
Figure 1A:
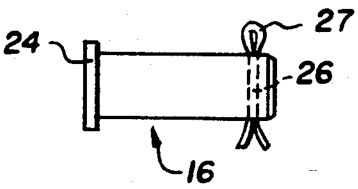
FIG. 1A shows a clevis pin with a split pin in place.

FIG. 1 shows an air pot 10 of a braking system with a push rod 12 extending from the pot 10. The push rod 12 ends in a clevis 14. There is a clevis pin 16 extending through the clevis 14. Pin 16 also extends through an arm 18 of a brake slack adjuster 20 mounted on a shaft 22. The air pot and the brake slack adjuster are conventional. For clarity, clevis pin 16 is shown in FIG. 1A.

The positioning of the clevis pin 16 is such that it cannot be hammered. However due to the severe loads to which it is subjected during use it is frequently distorted. It is usually corroded. The pin 16 has a head 24 at one end and an opening 26 at its other end. The opening 26 receives a split pin 27 on the outside of the clevis 14. The use of a head at one end and a split pin at the other is a common way of ensuring that a clevis pin will not fall out during use.

When it is necessary to service the parts, the split pin 27 is removed. That is seldom a problem; split pins are normally of fairly light construction and of soft metal. The intention is that once the split pin has been removed the clevis pin 16 can be tapped from the aligned openings in the arm 18 and the clevis 14 but this is seldom possible. In fact it is necessary to apply considerable force to remove the clevis pin 16 if it is distorted and corroded. Hammering to remove is difficult as space is limited.

The press according to the present invention addresses this problem. It comprises a housing 28 having a recess 30 that fits over the arm 18 and the clevis 14. When the press is in position a first part 32 is on one side of the clevis 14 and a second part 34 on the other side of the clevis 14 as shown most clearly in FIG. 2. There is a first channel 36 in the first part 32 of the housing and a second channel 38 in the second part 34 of the housing. The channels 36 and 38 are substantially coaxial. The first channel 36 includes a threaded portion 40 that receives a threaded member 42. The threaded member 42 extends into the first channel 36. The threaded member 42 has a head 44 so that it can be turned and thus reciprocated in the first channel 36.

There is a sleeve 46 that can slide in the first channel 36. Resilient means in the form of spring 47 tend to urge the sleeve 46 from the channel 36.

The second channel 38 is dimensioned to be a quite close fit over the head 24 of the clevis pin 16 and the sleeve 46 is dimensioned to be a quite close fit over the shaft of the pin 16. Second channel 38 is not essential. It is sufficient that second part 34 of the body be dimensioned simply to contact the clevis 14 but channel 38 provides additional stability.

To prevent the sleeve 46 moving from the first channel 36 there are means to limit movement of the sleeve 46. In the illustrated embodiment the means to limit movement comprises a groove 48 in the sleeve 46. There is a grub screw 50 extending through the housing 28 to engage the groove 48. Abutment of the screw 50 with the end walls of the groove 48 restricts longitudinal movement of the sleeve 46 and abutment of the screw 50 with the side walls of the groove 48 restricts rotation of the sleeve 46. As shown, the sleeve 46 may be bevelled at 52 to facilitate its fitting over the shaft of the clevis pin 16.

Figure 2:
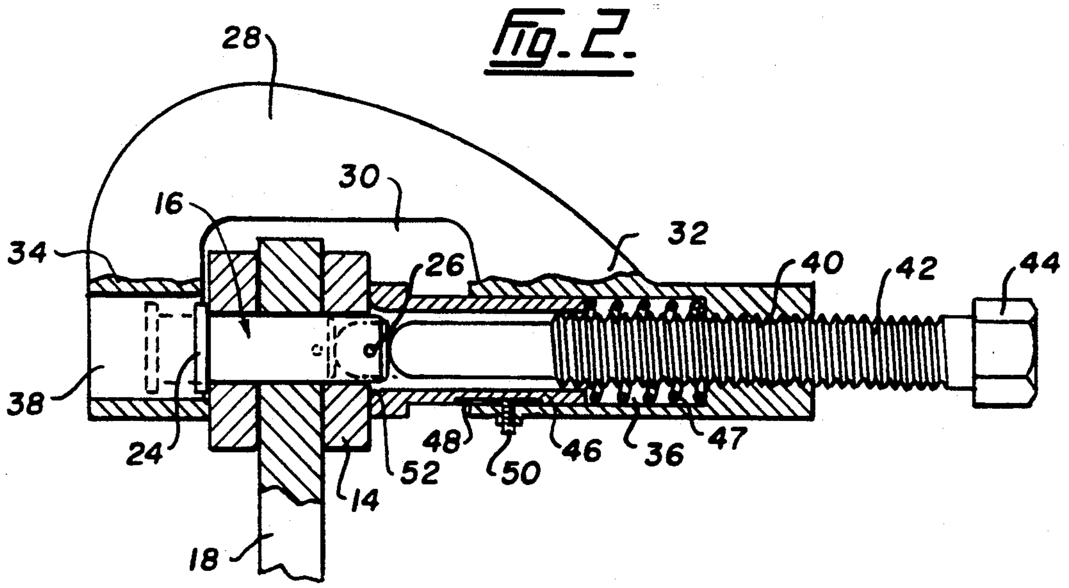
FIG. 2 is a view, partly in section of the press in position on a clevis pin.

To use the press of the present invention on a braking system to be serviced, the split pin 27 is removed from the clevis pin 16 and the press moved into the position shown in FIG. 2 with member 42 slightly retracted. The sleeve 46 is retracted by the fingers against the force of spring 47 to move the sleeve 46 over the pin 16. On release the sleeve 46 moves to fit over the end of the clevis pin 16 which, of course, projects beyond the clevis 14. The sleeve 46, urged outwardly by spring 47, acts to center member 42 relative to pin 16.

The spring 47 also ensures that the press is positively located on the clevis 14 even before member 42 has been rotated. Once the press is in position the member 42 is rotated and the force developed is sufficient to move the clevis pin 16 from the clevis 14 through the second channel 38. The joint may then be broken and servicing continued.

The particular advantage of the present invention is that considerable force can be brought to bear even though the space is extremely limited, too limited, for example, to allow hammering. The press also avoids the necessity of cutting with a hack saw or a flame. Cutting is clearly undesirable. Cutting requires replacement of one or more major components that may be working perfectly well. Furthermore the use of flame on a vehicle obviously introduces a fire hazard.

I claim:

1. A press to remove a clevis pin having a shaft and a head at one end of the shaft from a clevis, the press comprising:

a generally C-shaped housing having a recess open at one side to fit over the clevis with a first part of the housing on one side of the clevis and a second part on the other side of the clevis;

a first channel in the first part of the housing;

a second channel in the second part of the housing, the second channel being dimensioned to be a close fit over the head of the clevis pin and to allow passage of the clevis pin;

a threaded portion in the first channel;

a threaded member received in said threaded portion and able to extend into the first channel;

a sleeve slidably received in the first channel and dimensioned to be a close fit over the shaft of the pin, said sleeve having a flattened end to abut one side of the clevis with an open end or the sleeve located over that part of the shaft of the clevis pine projecting from said one side of the clevis;

a coil spring tending to urge the sleeve from the first channel, whereby the sleeve may be positioned and stabilized over one end of the pin with the end of the sleeve contacting said one side of the clevis and the threaded member rotated to drive the pin along the second channel and out of the clevis.

2. A press as claimed in claim 1 in which the coil spring is housed in the first channel, between the threaded portion and the sleeve.

3. A press as claimed in claim 1 including means to limit movement of the sleeve in the first channel.

4. A press as claimed in claim 3 in which the means to limit movement comprises a groove having side and end walls formed in the sleeve;

a screw extending through the housing to engage the groove whereby abutment of the screw with the end walls of the groove restricts longitudinal movement of the sleeve.

5. A press as claimed in claim 1 in which the threaded member has a head to receive a wrench.

6. A press as claimed in claim 1 in which the sleeve is bevelled at one end to facilitate its fitting over the pin.

* * * * *